(12) United States Patent
Kaida

(10) Patent No.: US 8,576,331 B2
(45) Date of Patent: Nov. 5, 2013

(54) IMAGE PICKUP APPARATUS THAT PERFORMS EXPOSURE CONTROL, METHOD OF CONTROLLING THE IMAGE PICKUP APPARATUS, AND STORAGE MEDIUM

(75) Inventor: Hironori Kaida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/474,136

(22) Filed: May 17, 2012

(65) Prior Publication Data
US 2012/0300094 A1 Nov. 29, 2012

(30) Foreign Application Priority Data

May 24, 2011 (JP) .................................. 2011-115787
May 15, 2012 (JP) .................................. 2012-111263

(51) Int. Cl.
*H04N 5/238* (2006.01)
*H04N 5/235* (2006.01)
*H04N 5/228* (2006.01)
*G03B 7/00* (2006.01)

(52) U.S. Cl.
USPC ..................... 348/364; 348/222.1; 348/229.1; 348/362

(58) Field of Classification Search
USPC .............. 348/207.99–207.1, 221.1, 222.1, 348/229.1–230.1, 234, 333.01–333.12, 348/362–368; 382/162–172, 254–275; 396/213–262
See application file for complete search history.

(56) References Cited

U.S. PATENT DOCUMENTS

| 2002/0012065 | A1* | 1/2002 | Watanabe | 348/364 |
|---|---|---|---|---|
| 2004/0189818 | A1* | 9/2004 | Tsuruoka et al. | 348/221.1 |
| 2004/0207734 | A1* | 10/2004 | Horiuchi | 348/229.1 |
| 2005/0264683 | A1* | 12/2005 | Kamon et al. | 348/362 |
| 2006/0044459 | A1* | 3/2006 | Kato | 348/362 |
| 2007/0081721 | A1* | 4/2007 | Xiao et al. | 382/167 |
| 2007/0115372 | A1* | 5/2007 | Wu et al. | 348/230.1 |
| 2007/0195385 | A1* | 8/2007 | Matsuzaka | 358/520 |
| 2008/0111913 | A1* | 5/2008 | Okamoto | 348/363 |
| 2008/0252791 | A1* | 10/2008 | Mitsunaga | 348/673 |
| 2010/0201842 | A1* | 8/2010 | Jung et al. | 348/229.1 |
| 2011/0069205 | A1* | 3/2011 | Kasai et al. | 348/239 |
| 2011/0128435 | A1* | 6/2011 | Ikeda | 348/362 |
| 2012/0194705 | A1* | 8/2012 | Yoshida | 348/238 |
| 2012/0281133 | A1* | 11/2012 | Kurita et al. | 348/362 |
| 2013/0057729 | A1* | 3/2013 | Ajito | 348/234 |

FOREIGN PATENT DOCUMENTS

JP 4306750 8/2009

* cited by examiner

*Primary Examiner* — Michael Osinski
(74) *Attorney, Agent, or Firm* — Cowan, Liebowitz & Latman, P.C.

(57) ABSTRACT

An image pickup apparatus capable of not only detecting whiteout or blackout but also effectively achieving exposure control. In the image pickup apparatus, an entire-screen brightness frequency distribution is detected based on a picked-up image signal. The image pickup apparatus calculates a first exposure control value from the entire-screen brightness frequency distribution. The image signal is divided into a plurality of small areas, and the brightness of each of the small areas is detected. The image pickup apparatus calculates a second exposure control value from the brightness. The image pickup apparatus calculates an exposure correction value based on the first exposure control value and the second exposure control value. An exposure value is calculated using the exposure correction value and an exposure value of the image signal. The image pickup apparatus performs exposure control of the image pickup section based on the calculated exposure value.

15 Claims, 13 Drawing Sheets

FIG. 5A

| IP1 | IP2 | IP3 | IP3 | IP4 | IP5 | IP6 |
|---|---|---|---|---|---|---|
| IP7 | IP8 | IP9 | IP10 | IP11 | IP12 | IP13 |
| IP14 | IP15 | IP16 | IP17 | IP18 | IP19 | IP20 |
| IP21 | IP22 | IP23 | IP24 | IP25 | IP26 | IP27 |
| IP28 | IP29 | IP30 | IP31 | IP32 | IP33 | IP34 |
| IP35 | IP36 | IP37 | IP38 | IP39 | IP40 | IP41 |
| IP42 | IP43 | IP44 | IP45 | IP46 | IP47 | IP48 |

IPXX ADDRESS INDICATIVE OF POSITION OF SMALL AREA

☐ SMALL-AREA BLOCK

FIG. 5B

| IP1 | IP2 | IP3 | IP3 | IP4 | IP5 | IP6 |
|---|---|---|---|---|---|---|
| IP7 | IP8 | IP9 | IP10 | IP11 | IP12 | IP13 |
| IP14 | IP15 | IP16 | IP17 | IP18 | IP19 | IP20 |
| IP21 | IP22 | IP23 | IP24 | IP25 | IP26 | IP27 |
| IP28 | IP29 | IP30 | IP31 | IP32 | IP33 | IP34 |
| IP35 | IP36 | IP37 | IP38 | IP39 | IP40 | IP41 |
| IP42 | IP43 | IP44 | IP45 | IP46 | IP47 | IP48 |

RANGE OF DETECTED BLOCKS

IPXX ADDRESS INDICATIVE OF POSITION OF SMALL AREA

☐ SMALL-AREA BLOCK

▨ DETECTED BLOCK

IMAGE PICKUP APPARATUS THAT PERFORMS EXPOSURE CONTROL, METHOD OF CONTROLLING THE IMAGE PICKUP APPARATUS, AND STORAGE MEDIUM

BACKGROUND OF THE INVENTION

1. Field of the Invention

The present invention relates to an image pickup apparatus that performs an image pickup operation while controlling exposure according to the brightness of an object, a method of controlling the image pickup apparatus, and a storage medium.

2. Description of the Related Art

In general, an image pickup apparatus using a solid-state image pickup device, such as a CCD or a CMOS, controls the exposure amount of the image pickup device by operating a diaphragm or adjusting shutter speed, to thereby control the amount of exposure to the image pickup device. For example, in the case of shooting a bright scene by the image pickup apparatus, it is possible to increase the shutter speed to thereby adjust the brightness of an object to be recorded in a picked-up image to an appropriate brightness. On the other hand, in the case of shooting a dark scene by the image pickup apparatus, it is possible to reduce the shutter speed to thereby adjust the brightness of an object to be recorded in a picked-up image to an appropriate brightness. In short, the image pickup apparatus is capable of suppressing whiteout or blackout by controlling the amount of exposure to the image pickup device.

There has conventionally been proposed an image pickup apparatus that employs a method in which whiteout or blackout is detected based on the brightness frequency distribution of brightness over an entire screen determined from a picked-up image signal, and the amount of exposure is controlled according the detected brightness frequency distribution to thereby suppress whiteout or blackout (see e.g. Japanese Patent No. 4306750).

However, even though the above-mentioned image pickup apparatus is capable of detecting whiteout and blackout, it is difficult for the image pickup apparatus to determine whether whiteout areas or blackout areas are scattered or concentrated.

This reason will be explained with reference to FIGS. 12A to 12D. FIG. 12A is a view illustrating a picked-up image in which whiteout has occurred in a concentrated manner by a void portion. FIG. 12B is a view illustrating a picked-up image in which a plurality of point light sources existing in a scatter manner has caused whiteout areas in a scattered manner. FIG. 12C is a diagram showing brightness frequency distribution (histogram) of the FIG. 12A picked-up image, and FIG. 12D is a diagram showing brightness frequency distribution of the FIG. 12B picked-up image.

In FIG. 12A, the whiteout areas are concentrated, while in FIG. 12B, the whiteout areas are scattered. However, as shown in FIGS. 12C and 12D, the brightness frequency distributions have the same shape because the picked-up images in FIGS. 12A and 12B have the same total whiteout area.

In the case shown in FIG. 12A, since the whiteout areas are concentrated, whiteout is visually conspicuous. There is a possibility that gradation is actually lost in the whiteout areas, and hence there is a possibility that void gradation can be reproduced by performing exposure control such that the amount of exposure is reduced.

On the other hand, in the case shown in FIG. 12B, since the whiteout areas are scattered, whiteout is not visually conspicuous. For this reason, reduction of the exposure amount makes noise conspicuous in the picked-up image. Therefore, exposure control should not be performed such that the exposure amount is reduced. In other words, it is desirable that the exposure control is performed while targeting only visually conspicuous whiteout areas.

However, no conventional image pickup apparatus is capable of discriminating between the two scenes in FIGS. 12A and 12B and performing exposure control differently according to the result of the discrimination.

SUMMARY OF THE INVENTION

The present invention provides an image pickup apparatus which is capable of not only detecting whiteout or blackout, but also effectively achieving exposure control depending on distribution of whiteout areas or blackout areas, a method of controlling the image pickup apparatus, and a storage medium.

In a first aspect of the present invention, there is provided an image pickup apparatus that includes an image pickup section for picking up object light and outputting an image signal, comprising a first brightness detection unit configured to detect an entire-screen brightness frequency distribution based on the image signal, a first exposure control value calculation unit configured to calculate a first exposure control value from the entire-screen brightness frequency distribution, a second brightness detection unit configured to divide the image signal into a plurality of small areas and detect a brightness of each of the small areas, a second exposure control value calculation unit configured to calculate a second exposure control value from the brightness, which is detected by the second brightness detection unit, of each of the small areas, an exposure correction value calculation unit configured to calculate an exposure correction value based on the first exposure control value and the second exposure control value, an exposure value calculation unit configured to calculate an exposure value using the exposure correction value and an exposure value used in outputting the image signal, and an exposure control unit configured to perform exposure control of the image pickup section based on the exposure value calculated by the exposure value calculation unit.

In a second aspect of the present invention, there is provided a method of controlling an image pickup apparatus that includes an image pickup section for picking up object light and outputting an image signal, comprising detecting an entire-screen brightness frequency distribution based on the image signal, calculating a first exposure control value from the entire-screen brightness frequency distribution, dividing the image signal into a plurality of small areas and detecting a brightness of each of the small areas, calculating a second exposure control value from the detected brightness of each of the small areas, calculating an exposure correction value based on the first exposure control value and the second exposure control value, calculating an exposure value using the exposure correction value and an exposure value used in outputting the image signal, and performing exposure control of the image pickup section based on the calculated exposure value.

In a third aspect of the present invention, there is provided a non-transitory computer-readable storage medium storing a computer-executable program for executing a method of controlling an image pickup apparatus that includes an image pickup section for picking up object light and outputting an image signal, wherein the method comprises detecting an entire-screen brightness frequency distribution based on the image signal, calculating a first exposure control value from the entire-screen brightness frequency distribution, dividing the image signal into a plurality of small areas and detecting a brightness of each of the small areas, calculating a second exposure control value from the detected brightness of each of the small areas, calculating an exposure correction value based on the first exposure control value and the second exposure control value, calculating an exposure value using the exposure correction value and an exposure value used in outputting the image signal, and performing exposure control of the image pickup section based on the calculated exposure value.

According to the present invention, it is possible to detect whiteout or blackout and effectively achieve exposure control depending on distribution of whiteout areas or blackout areas.

Further features of the present invention will become apparent from the following description of exemplary embodiments with reference to the attached drawings.

BRIEF DESCRIPTION OF THE DRAWINGS

FIGS. 5A and 5B are diagrams useful in explaining the operations of the small-area brightness detection section and a small-area brightness-based exposure control value calculation section of the image pickup apparatus according to the first embodiment.

DESCRIPTION OF THE EMBODIMENTS

The present invention will now be described in detail below with reference to the accompanying drawings showing embodiments thereof. First, an image pickup apparatus according to a first embodiment of the present invention will be described with reference to FIGS. 1 to 6. The image pickup apparatus of the first embodiment is configured to be capable of performing exposure control to prevent whiteout or blackout, according to the entire-screen frequency distribution of a picked-up image signal and the small-area brightness of each of small areas obtained by dividing a screen of the picked-up image signal.

Figure 1:
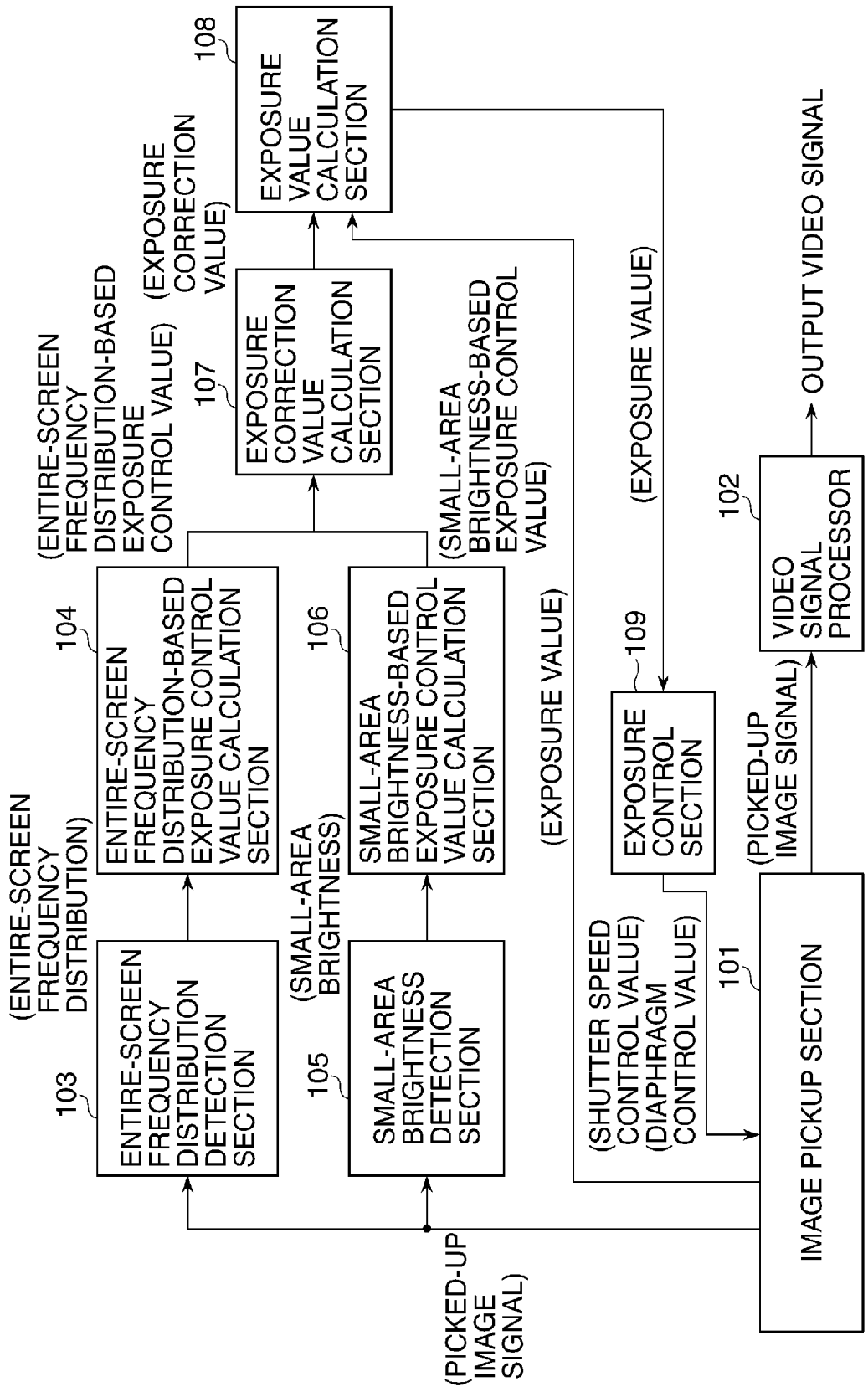
FIG. 1 is a schematic block diagram of essential parts of an image pickup apparatus according to a first embodiment of the present invention.

FIG. 1 is a schematic block diagram of essential parts of the image pickup apparatus according to the first embodiment. Referring to FIG. 1, reference numeral 101 denotes an image pickup section that picks up object light based on an exposure control value delivered from an exposure control section 109 and outputs a picked-up image signal. Reference numeral 102 denotes a video signal processor that converts the picked-up image signal output from the image pickup section 101 to an output video signal. Reference numeral 103 denotes an entire-screen frequency distribution detection section that detects frequency distribution of brightness over an entire screen from the picked-up image signal. Reference numeral 104 denotes an entire-screen frequency distribution-based exposure control value calculation section that calculates an entire-screen frequency distribution-based exposure control value based on the entire-screen frequency distribution detected from the picked-up image signal by the entire-screen frequency distribution detection section 103. Reference numeral 105 denotes a small-area brightness detection section that divides the entire screen based on the picked-up image signal into a plurality of small areas and detects a brightness representative of the small areas.

Reference numeral 106 denotes a small-area brightness-based exposure control value calculation section that calculates a small-area brightness-based exposure control value based on the small-area brightness of the picked-up image signal detected by the small-area brightness detection section 105. Reference numeral 107 denotes an exposure correction value calculation section that calculates an exposure correction value based on the entire-screen frequency distribution-based exposure control value and the small-area brightness-based exposure control value. Reference numeral 108 denotes an exposure value calculation section that calculates an exposure value for pickup of the next frame, based on the exposure correction value calculated by the exposure correction value calculation section 107 and an exposure value for the current frame of the picked-up image signal. The exposure control section 109 outputs a control value for controlling the image pickup section 101, which is obtained by converting the exposure value calculated for pickup of the next frame by the exposure value calculation section 108 to a diaphragm control value and a shutter speed control value, to the image pickup section 101.

Next, a description will be given of the image pickup section 101, the entire-screen frequency distribution detection section 103, the entire-screen frequency distribution-based exposure control value calculation section 104, the small-area brightness detection section 105, and the small-area brightness-based exposure control value calculation section 106.

Figure 2:
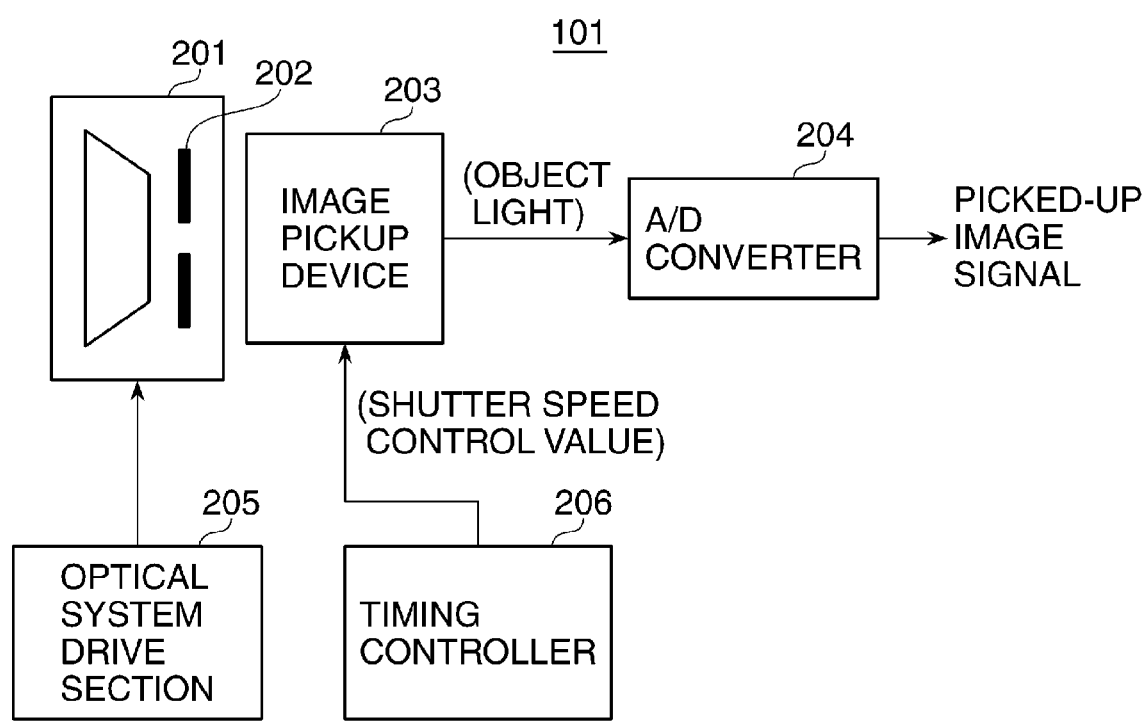
FIG. 2 is a schematic block diagram of an image pickup section of the image pickup apparatus according to the first embodiment.

Referring to FIG. 2, the image pickup section 101 comprises a photographic optical section 201, a diaphragm 202, an image pickup device 203, an analog-to-digital converter 204, an optical system drive section 205, and a timing controller 206. The image pickup section 101 comprising these devices picks up object light and outputs a picked-up image signal.

In the image pickup section 101, the photographic optical section 201 driven for shooting by the optical system drive section 205 controls the aperture area of the diaphragm 202 and guides object light into the image pickup device 203. The image pickup device 203 picks up the image of the object using e.g. a CCD or a CMOS, then converts the obtained object image into an electric signal, and then outputs the electric signal to the analog-to-digital converter 204. During the shooting, the timing controller 206 outputs a shutter speed control value to the image pickup device 203 to thereby control exposure time of the object light. The analog-to-digital converter 204 having received the electric signal from the image pickup device 203 converts the analog signal to a digital one.

Next, a description will be given of the entire-screen frequency distribution detection section 103 of the image pickup apparatus of the present embodiment. In the entire-screen frequency distribution detection section 103, the brightness value of a picked-up image signal is used as brightness information of the picked-up image signal. The entire-screen frequency distribution detection section 103 detects cumulative values each obtained by counting pixels of the picked-up image signal having an associated brightness value over a range of the upper or lower limit brightness value to a designated brightness value, as an entire-screen frequency distribution of the picked-up image signal, and outputs the detected entire-screen frequency distribution to the entire-screen frequency distribution-based exposure control value calculation section 104.

Figure 3A:
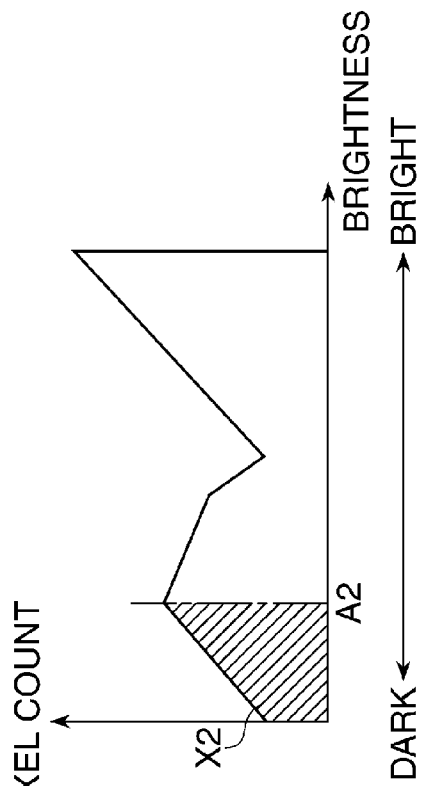
FIGS. 3A, 3B, 3C, and 3D are diagrams useful in explaining the function of a small-area brightness detection section of the image pickup apparatus according to the first embodiment.
Figure 3B:
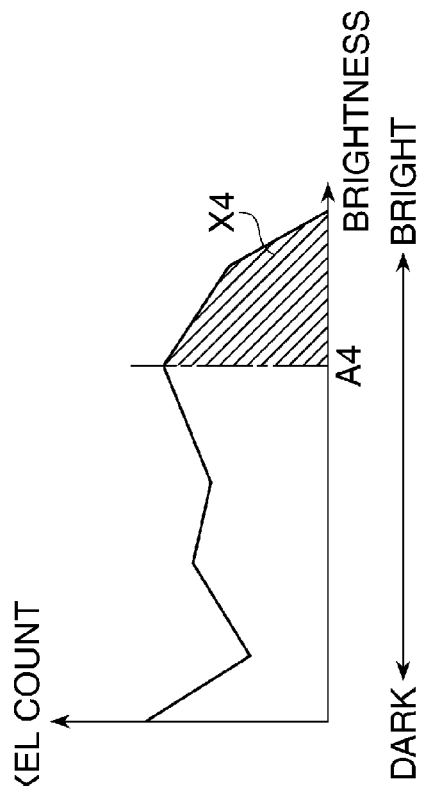
Figure 3C:
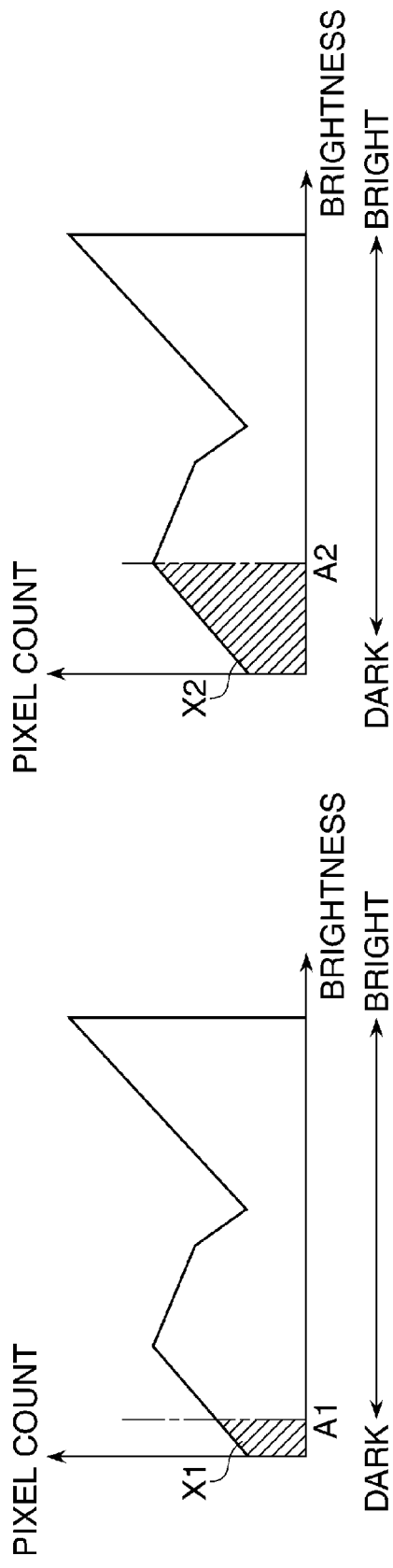
Figure 3D:
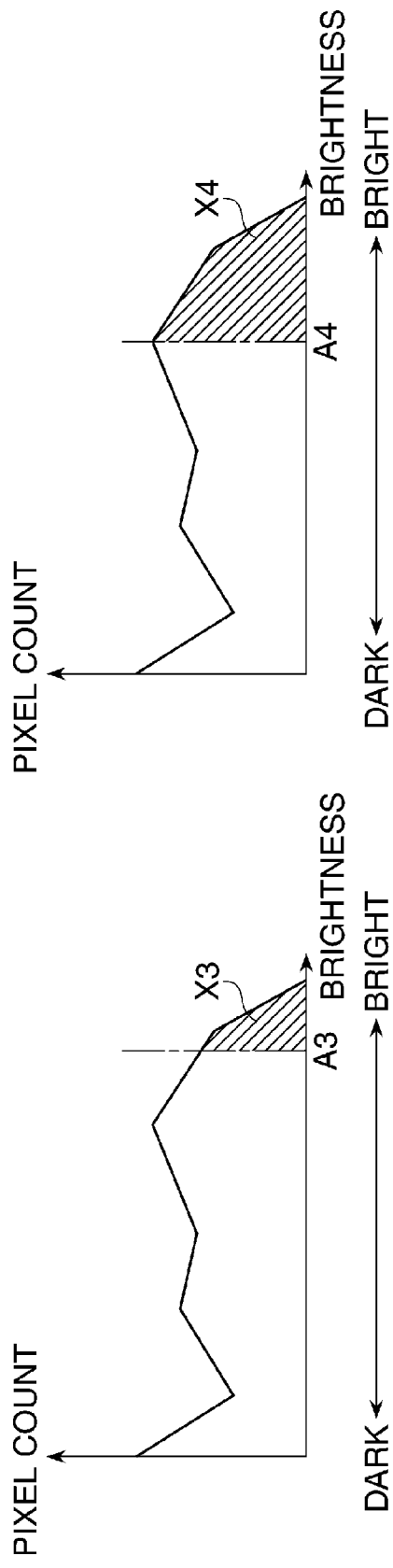

In the entire-screen frequency distribution detection section 103, a designated brightness value A1 is set as a brightness value corresponding to e.g. 1% of the upper limit brightness value of a brightness range within which brightness can be handled by the picked-up image signal, as illustrated in FIG. 3A, and a designated brightness value A2 in FIG. 3B is set as a brightness value corresponding to e.g. 10% of the upper limit brightness value of the brightness range. Further, in the entire-screen frequency distribution detection section 103, a designated brightness value A3 in FIG. 3C is set as a brightness value corresponding to e.g. 99% of the upper limit brightness value of the brightness range, and a designated brightness value A4 in FIG. 3D is set as a brightness value corresponding to e.g. 90% of the upper limit brightness value of the brightness range.

The entire-screen frequency distribution detection section 103 detects the entire-screen frequency distribution of the picked-up image signal by detecting the entire-screen pixel brightness concentration degree of the picked-up image signal. The entire-screen frequency distribution detection section 103 detects two different count values, i.e. a count value X1 calculated over a range from a designated lower limit brightness value to the designated brightness value A1 in FIG. 3A and a count value X2 calculated over a range from the designated lower limit brightness value to the designated brightness value A2 in FIG. 3B. Further, the entire-screen frequency distribution detection section 103 detects two other different count values, i.e. a count value X3 calculated over a range from a designated upper limit brightness value to the designated brightness value A3 in FIG. 3C and a count value X4 calculated over a range from the designated upper limit brightness value to the designated brightness value A4 in FIG. 3D.

In the present embodiment, a user is caused in advance to select between exposure control for reducing whiteout and exposure control for reducing blackout, according to whether the user desires an image with whiteout reduced or with blackout reduced. The entire-screen frequency distribution detection section 103 switches, according to the user election (user instruction given via an interface, not shown), between a calculation process for calculating an entire-screen frequency distribution-based exposure control value, described hereinafter, which is executed when blackout occurs, and a calculation process for calculating an entire-screen frequency distribution-based exposure control value, described hereinafter, which is executed when whiteout occurs. Alternatively, after detection of the count values X1 to X4, switching between the calculation process for calculating the entire-screen frequency distribution-based exposure control value for reducing blackout and the calculation process for calculating the entire-screen frequency distribution-based exposure control value for reducing whiteout may be automatically performed based on the relationship in magnitude between the count values X1 and X3 or between the count values X2 and X4. For example, if X1>X3, the calculation process for calculating the entire-screen frequency distribution-based exposure control value for reducing blackout is executed.

Note that the pixel brightness of the picked-up image signal may be represented by the pixel value of the picked-up image signal yet to be converted to a color signal or that of one of the R, G, and B components of the picked-up image signal having been converted to the color signal. Further, it is not necessarily required to perform pixel-by-pixel counting so as to obtain a count value. For example, a pixel count indicative of 1% of the total count value of all the pixels of a picked-up image signal may be set as a count value of 1. In this case, the pixel count value expresses the number of pixels as a percentage thereof in all the pixels of the picked-up image signal.

A description will be given of calculation of an entire-screen frequency distribution-based exposure control value for reducing blackout. The entire-screen frequency distribution-based exposure control value calculation section (hereinafter referred to as "control value calculation section") 104 compares between the count value X1 in FIG. 3A and the count value X3 in FIG. 3C. When the count value X1 in FIG. 3A is larger, the control value calculation section 104 detects that blackout areas form a large proportion of the picked-up image signal. In short, the control value calculation section 104 calculates the entire-screen frequency distribution-based exposure control value for reducing blackout.

Figure 4A:
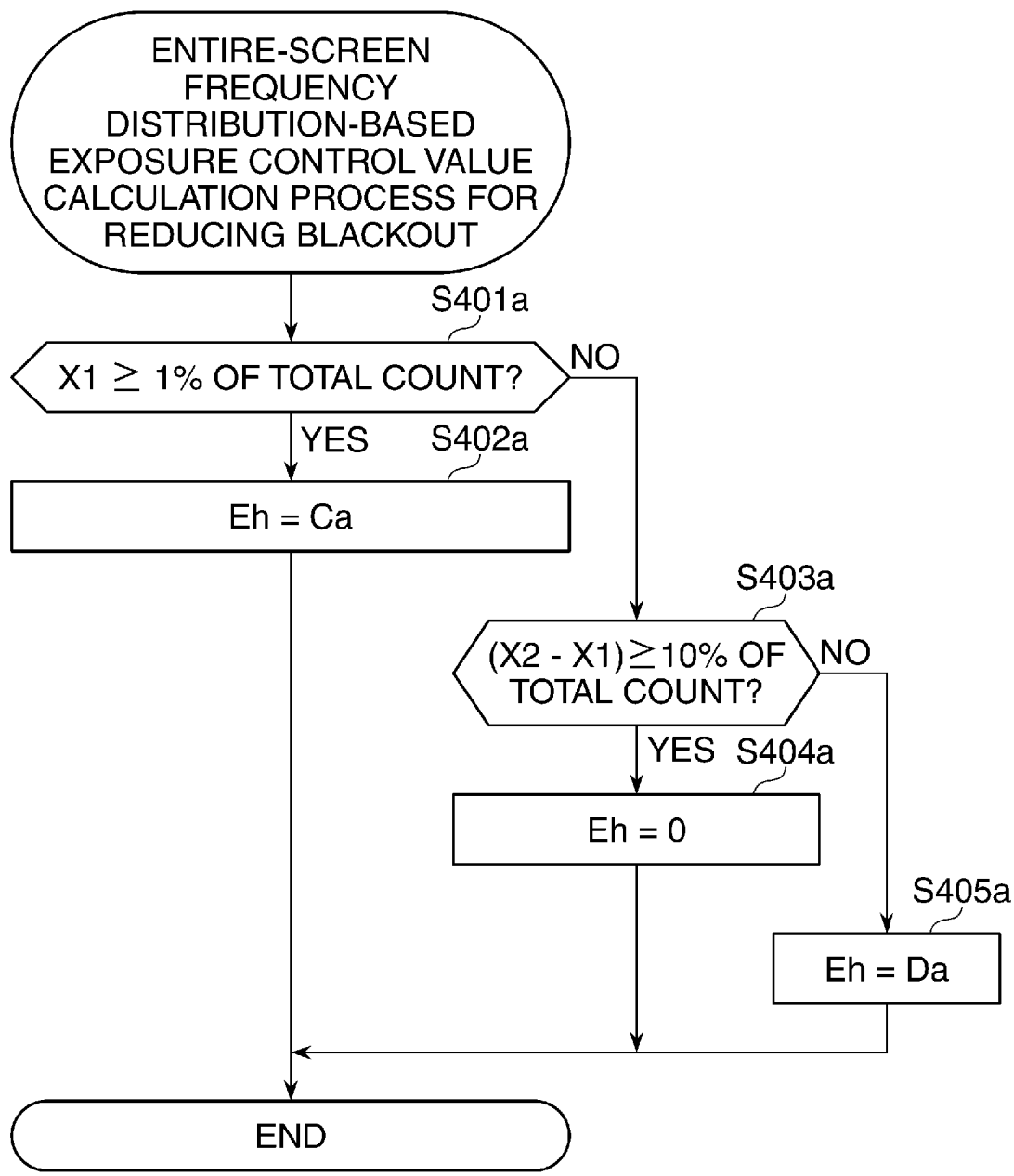
FIG. 4A is a flowchart of a calculation process for reducing blackout, which is executed by an entire-screen frequency distribution-based exposure control value calculation section of the image pickup apparatus according to the first embodiment.

A description will be given of the calculation process for calculating the entire-screen frequency distribution-based exposure control value for reducing blackout, with reference to FIG. 4A. The calculation process for calculating the entire-screen frequency distribution-based exposure control value for reducing blackout is started by the control value calculation section 104 when shooting is to be performed by the image pickup apparatus, and performs determination so as to detect blackout. For example, if the pixel count value X1 is equal to or larger than 1% of the total count value of all the pixels of the picked-up image signal as shown in FIG. 3A (YES to a step S401$a$), it is determined that blackout has been detected. If the control value calculation section 104 determines that blackout has been detected, the control value calculation section 104 proceeds to a step S402$a$. On the other hand, if the pixel count value X1 is smaller than 1% of the total count value of all the pixels of the picked-up image signal (NO to the step S401$a$), the control value calculation section 104 determines that blackout has not been detected, and the control value calculation section 104 proceeds to a step S403$a$.

In the step S402$a$, the control value calculation section 104 sets an entire-screen frequency distribution-based exposure control value Eh to a value Ca, followed by terminating the present process. The value Ca of the entire-screen frequency distribution-based exposure control value Eh is such a value that makes the count value X1 shown in FIG. 3A smaller than 1% of the total count value of all the pixels of the picked-up image signal.

After determining that blackout has not occurred to proceed to the step S403a, the control value calculation section 104 determines whether or not the exposure value is appropriate for preventing black floating. At this time, the control value calculation section 104 determines, using the count value X1 in FIG. 3A and the count value X2 in FIG. 3B, whether or not a value of (X2−X1) is equal to or larger than 10% of the total count value to thereby determine whether or not the exposure value is appropriate for preventing black floating.

An image suffering from "black floating" is intended to mean an image having no or almost no pixels found in a dark portion of a brightness value frequency distribution obtained by subjecting the image to analysis therefor. In an image suffering from "black floating", it sometimes occurs that a dark portion looks floating, making the image low in contrast. Therefore, it is required to determine whether or not such an exposure value which does not cause black floating is set.

If the control value calculation section 104 determines that the value of (X2−X1) is not smaller than 10% of the total count value, i.e. that the exposure value is appropriate for preventing black floating, the control value calculation section 104 proceeds to a step S404a. On the other hand, if the control value calculation section 104 determines that the value of (X2−X1) is smaller than 10% of the total count value, i.e. that the exposure value can cause black floating, the control value calculation section 104 proceeds to a step S405a.

When the control value calculation section 104 proceeds to the step S404a, i.e. when blackout has not been detected and the exposure value is appropriate for preventing black floating, the control value calculation section 104 sets the entire-screen frequency distribution-based exposure control value Eh to 0, followed by terminating the present process.

In the step S405a, the control value calculation section 104 sets the entire-screen frequency distribution-based exposure control value Eh to a value Da so as to reduce black floating, followed by terminating the present process. Note that the control value calculation section 104 stores the entire-screen frequency distribution-based exposure control values Ca and Da as appropriately set fixed values in a storage section, not shown, in advance. For example, the control value calculation section 104 may set a positive value in the step S402a and a negative value in the step S405a. Insofar as the sign of Ca is plus (Ca>0) and the sign of Da is minus (Da<0) hold, the respective absolute values of the entire-screen frequency distribution-based exposure control values Ca and Da may be equal to or different from each other.

Figure 4B:
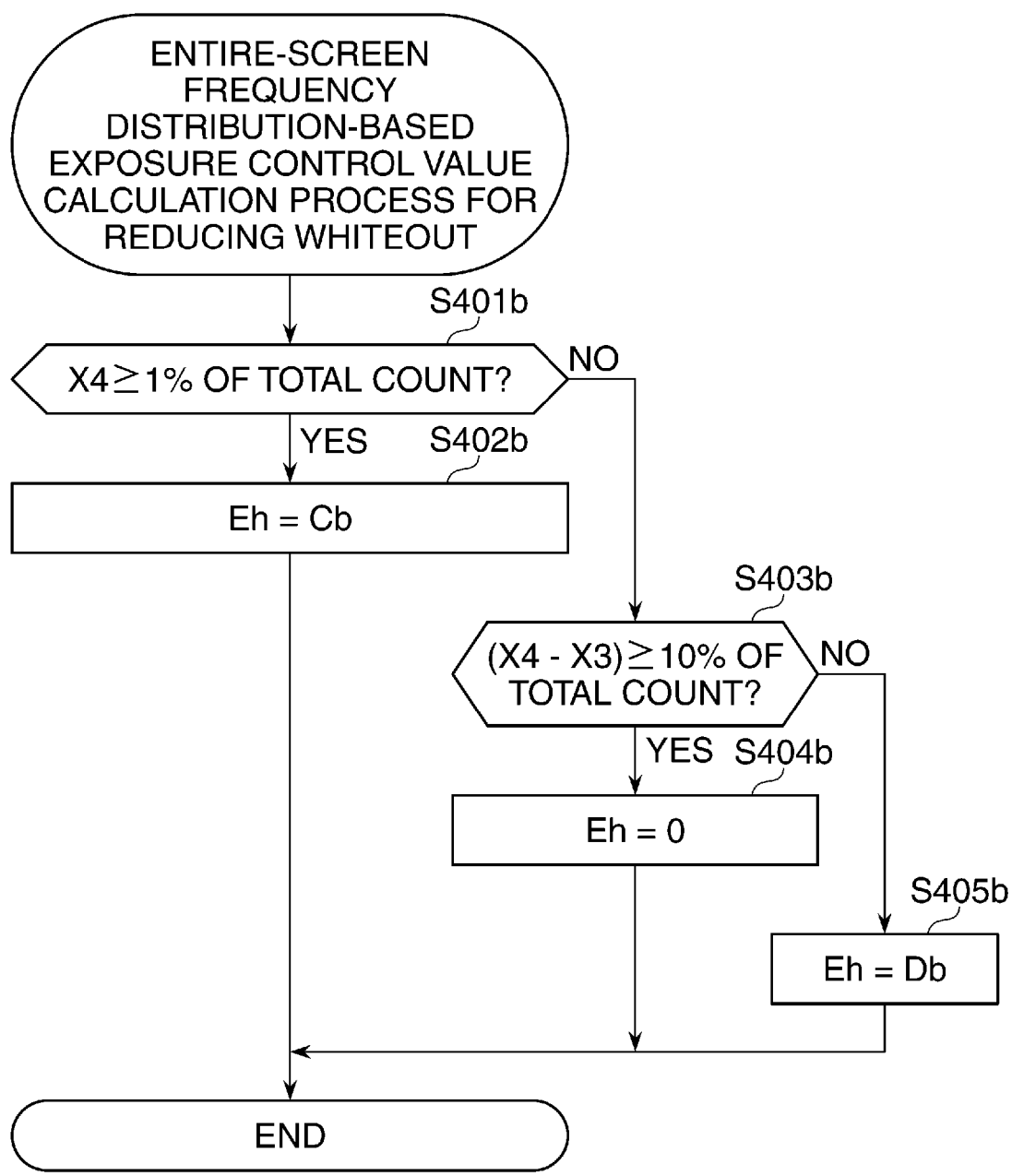
FIG. 4B is a flowchart of a calculation process for reducing whiteout, which is executed by the entire-screen frequency distribution-based exposure control value calculation section.

Next, a description will be given of a calculation process for calculating the entire-screen frequency distribution-based exposure control value for reducing whiteout, with reference to FIG. 4B. The control value calculation section 104 compares between the count value X1 in FIG. 3A and the count value X3 in FIG. 3C. When the count value X3 in FIG. 3C is larger, the control value calculation section 104 detects that whiteout areas form a large proportion of the picked-up image signal. In short, the control value calculation section 104 calculates the entire-screen frequency distribution-based exposure control value for reducing whiteout.

The calculation process for calculating the entire-screen frequency distribution-based exposure control value for reducing whiteout is started by the control value calculation section 104 when shooting is to be performed by the image pickup apparatus, and performs determination so as to detect whiteout.

If the pixel count value X3 is equal to or larger than 1% of the total count value of all the pixels of the picked-up image signal as shown in FIG. 3C (YES to a step S401b), the control value calculation section 104 determines that whiteout has been detected. When the control value calculation section 104 determines that whiteout has been detected, the control value calculation section 104 proceeds to a step S402b. On the other hand, if the pixel count value X3 is smaller than 1% of the total count value of all the pixels of the picked-up image signal (NO to the step S401b), the control value calculation section 104 determines that whiteout has not been detected, and the control value calculation section 104 proceeds to a step S403b.

When the process proceeds to the step S402b, i.e. when whiteout has been detected, the control value calculation section 104 sets the entire-screen frequency distribution-based exposure control value Eh to a value Cb, followed by terminating the present process. The value Cb of the entire-screen frequency distribution-based exposure control value Eh is such a value that makes the count value X4 smaller than 1% of the total count value of all the pixels of the picked-up image signal.

When the process proceeds to the step S403b, i.e. when whiteout has not been detected, the control value calculation section 104 determines whether or not the exposure value is appropriate for preventing white sinking. At this time, the control value calculation section 104 determines, using the count value X3 in FIG. 3C and the count value X4 in FIG. 3D, whether or not a value of (X4−X3) is equal to or larger than 10% of the total count value to thereby determine whether or not the exposure value is appropriate for preventing white sinking.

An image suffering from "white sinking" is intended to mean an image having few pixels found in a bright portion of the brightness value frequency distribution obtained by subjecting the image to analysis therefor. In an image suffering from "white sinking", it sometimes occurs that the image is dark as a whole, and therefore it is required to determine whether or not such an exposure value that does not cause white sinking is set.

If the control value calculation section 104 determines that the value of (X4−X3) is not smaller than 10% of the total count value, i.e. that the exposure value is appropriate for preventing white sinking, the control value calculation section 104 proceeds a step S404b. On the other hand, if the control value calculation section 104 determines that the value of (X4−X3) is smaller than 10% of the total count value, i.e. that the exposure value can cause white sinking, the control value calculation section 104 proceeds a step S405b.

When the control value calculation section 104 proceeds the step S404b, i.e. when whiteout has not been detected and the exposure value is appropriate for preventing white sinking, the control value calculation section 104 sets the entire-screen frequency distribution-based exposure control value Eh to 0, and in this case, immediately terminates the present process without executing exposure control.

When the control value calculation section 104 proceeds the step S405b, the control value calculation section 104 sets the entire-screen frequency distribution-based exposure control value Eh to a value Db so as to eliminate white sinking. Note that the control value calculation section 104 stores the entire-screen frequency distribution-based exposure control values Cb and Db as appropriately set fixed values in the storage section, not shown, in advance. For example, the control value calculation section 104 may set a positive value in the step S402b and a negative value in the step S405b. Insofar as the sign of Cb is minus (Cb<0) and the sign of Db is plus (Db>0) hold, the respective absolute values of the entire-screen frequency distribution-based exposure control values Cb and Db may be equal to or different from each other.

Next, a description will be given, with reference to FIG. 5A, of the small-area brightness detection section of the image pickup apparatus according to the present embodiment. The calculation of an exposure control value by the small-area brightness detection section 105 and the small-area brightness-based exposure control value calculation section 106 is performed in the step S401a in FIG. 4A or S401b in FIG. 4B when X1≥1% or X3≥1% holds. Small-area brightness detection is performed in a state where blackout or whiteout has occurred in the entire screen, so as to detect the degree of dispersion of blackout areas or whiteout areas.

The small-area brightness detection section 105 divides the entire screen of a picked-up image signal into small-area blocks and detects the brightness of each small-area block. Each of the small-area blocks has address information indicative of its position. For example, in FIG. 5A, the entire screen of a picked-up image signal is uniformly vertically and horizontally divided into 7×7 small-area blocks. The small-area brightness detection section 105 outputs an average brightness value of the small-area blocks as a small-area brightness to the small-area brightness-based exposure control value calculation section 106.

The small-area blocks are not limited to the above-described layout, but the vertical and horizontal dimensions of each block may be different from each other. Alternatively, the small-area blocks may not be all uniform in size, but may be different in size from each other. The small-area brightness detection section 105 may perform median filtering on brightness values of respective pixels in each small-area block and set the result of the median filtering as the small-area brightness of the associated small-area block. Further, the small-area brightness detection section 105 may calculate signal intensity integrated value which is dependent on the brightness value frequency distribution of the picked-up image signal in the small-area block. Alternatively, the small-area brightness detection section 105 may set the count of pixels the brightness of which is not lower than a predetermined value (set threshold value) as the small-area brightness of the associated small-area block. Further alternatively, the small-area brightness detection section 105 may set the count of pixels the brightness of which is not higher than a predetermined value (set threshold value) as the small-area brightness of the associated small-area block.

Next, the small-area brightness-based exposure control value calculation section 106 of the image pickup apparatus will be described with reference to FIG. 5B.

The small-area brightness-based exposure control value calculation section 106 detects small-area blocks having a small-area brightness not higher or not lower than a predetermined value as a set threshold value and calculates a small-area brightness-based exposure control value. For example, the small-area brightness-based exposure control value calculation section 106 expresses the small-area brightness-based exposure control value as a binary value of 0 or 1 which is indicative of whether or not to perform small-area brightness-based exposure control. More specifically, the small-area brightness-based exposure control value is a multiplication value Ea which is used in calculation of an exposure correction value Er, referred to hereinafter, and by setting the multiplication value Ea to 0 or 1, whether to execute the small-area brightness-based exposure control is set.

In the case of calculating a small-area brightness-based exposure control value for reducing whiteout, the small-area brightness-based exposure control value calculation section 106 detects a small-area block having a brightness value higher than a brightness value of 200, for example. When a small-area block having a brightness value higher than the brightness value of 200 is detected, the small-area brightness-based exposure control value calculation section 106 determines that whiteout areas are concentrated in the small-area block of the picked-up image signal. In this case, the small-area brightness-based exposure control value calculation section 106 is required to control the exposure value used for pickup of the picked-up image signal to be low. More specifically, the small-area brightness-based exposure control value calculation section 106 sets the small-area brightness-based exposure control value to 1.

On the other hand, when no small-area blocks having a brightness value higher than the brightness value of 200 have been detected, even if some small-area blocks of the picked-up image signal contain a whiteout area, the small-area brightness-based exposure control value calculation section 106 determines that the whiteout areas are scattered. In this case, the small-area brightness-based exposure control value calculation section 106 determines that it is not required to perform the small-area brightness-based exposure control. Then, the small-area brightness-based exposure control value calculation section 106 sets the small-area brightness-based exposure control value to 0.

In the case of calculating a small-area brightness-based exposure control value for reducing blackout, the small-area brightness-based exposure control value calculation section 106 detects a small-area block having a brightness value not higher than a brightness value of 50, for example. When a small-area block having a brightness value not higher than the brightness value of 50 is detected, the small-area brightness-based exposure control value calculation section 106 determines that blackout areas are concentrated in the small-area block of the picked-up image signal. In this case, the small-area brightness-based exposure control value calculation section 106 determines that it is required to control the exposure value used for pickup of the picked-up image signal to be low, and sets the small-area brightness-based exposure control value to 1.

On the other hand, when no small-area blocks having a brightness value not higher than the brightness value of 50 have been detected, the small-area brightness-based exposure control value calculation section 106 determines that blackout areas are scattered. In this case, since there exists no small-area block in which blackout has occurred or blackout areas are scattered, the small-area brightness-based exposure control value calculation section 106 determines that it is not required to perform the small-area brightness-based exposure control, and sets the small-area brightness-based exposure control value to 0.

Alternatively, the small-area brightness-based exposure control value calculation section 106 may detect a contiguity between the detected small-area blocks (i.e. a range of contiguous small-area blocks) of which the brightness value is not lower than a predetermined value or not higher than a predetermined value are detected and calculate the small-area brightness-based exposure control value according to the detected contiguity. In this case, the small-area brightness-based exposure control value calculation section 106 forms a predetermined-area range detection unit for detecting a range of detected small-area blocks. For example, when a contiguity between small-area blocks, which is not smaller than a contiguous block count of three (a contiguity threshold value), is not detected, the small-area brightness-based exposure control value calculation section 106 sets the small-area brightness-based exposure control value to 0. On the other hand, when a contiguity between small-area blocks, which is not smaller than a contiguous block count of three (the contiguity threshold value), is detected, the small-area brightness-based exposure control value calculation section 106 sets the small-area brightness-based exposure control value to 1.

The small-area brightness-based exposure control value calculation section 106 may selectively determine, depending on the size of a small-area block, whether to calculate the small-area brightness-based exposure control value after detecting a contiguity between detected small-area blocks or without detecting a contiguity between detected small-area blocks. For example, when the size of a small-area block is smaller than a designated size, the small-area brightness-based exposure control value calculation section 106 detects a contiguity between detected small-area blocks. On the other hand, when the size of a small-area block is larger than a designated size, the small-area brightness-based exposure control value calculation section 106 calculates the small-area brightness-based exposure control value without detecting a contiguity between detected small-area blocks.

The small-area brightness-based exposure control value calculation section 106 may employ a method other the method in which the small-area brightness-based exposure control value is set to a binary value of 0 or 1. For example, the small-area brightness-based exposure control value calculation section 106 may calculate the small-area brightness-based exposure control value according to the number of contiguous small-area blocks which are detected to have a brightness value not lower than a predetermined value or not higher than a predetermined value which are to each other (hereinafter referred to as "the contiguous block count"). In this case, the small-area brightness-based exposure control value calculation section 106 sets the small-area brightness-based exposure control value to a predetermined value e.g. when the contiguous block count is not smaller than 5, and sets the small-area brightness-based exposure control value to 50% of the predetermined value when the contiguous block count is not smaller than 1 and smaller than 5.

Note that the small-area brightness-based exposure control value for reducing blackout is set to a positive value, and the small-area brightness-based exposure control value for reducing whiteout is set to a negative value. Further, when the number of small-area blocks connected to each other is equal to 0, the small-area brightness-based exposure control value is set to 0.

Next, a description will be given of an entire-screen exposure value determination process executed by the above-described image pickup apparatus of the first embodiment, with reference to FIG. 6.

When the user performs an operation for determining an exposure for shooting, the entire-screen exposure value determination process is started by the image pickup apparatus. Then, the control value calculation section 104 calculates the entire-screen frequency distribution-based exposure control value Eh from the picked-up image signal output from the image pickup section 101, as described with reference to FIGS. 4A and 4B (step S601). Then, depending on whether the answer to the question of the step S401a in FIG. 4A or the step S401b in FIG. 4B is affirmative (YES) or negative (NO), the following step is switched (step S602). More specifically, if the answer to the question of the step S401a in FIG. 4A or the step S401b in FIG. 4B is affirmative (YES), the process proceeds to a step S603. On the other hand, if the answer to the question of the step S401a in FIG. 4A or the step S401b in FIG. 4B is negative (NO), the process proceeds to a step S605 without calculation of the small-area brightness-based exposure control value Ea. In the step S603, the small-area brightness-based exposure control value calculation section 106 calculates the small-area brightness-based exposure control value Ea as described with reference to FIGS. 5A and 5B.

Then, the exposure correction value calculation section 107 corrects the entire-screen frequency distribution-based exposure control value Eh based on the small-area brightness-based exposure control value Ea calculated by the small-area brightness-based exposure control value calculation section 106, to thereby calculate an exposure correction value Er (step S604).

When the small-area brightness-based exposure control value Ea is equal to 0, the exposure correction value calculation section 107 judges that there are few bright portions occurring concentratedly, and hence sets the exposure correction value Er to 0. On the other hand, when the small-area brightness-based exposure control value Ea is equal to 1, the exposure correction value calculation section 107 sets the entire-screen frequency distribution-based exposure control value Eh to the exposure correction value Er (i.e. Er=Eh*Ea).

When the small-area brightness-based exposure control value Ea is equal to 0, the exposure correction value calculation section 107 may set the exposure correction value Er to part of the entire-screen frequency distribution-based exposure control value Eh. More specifically, assuming that $Er=\alpha*Eh+(1-\alpha)Ea*Eh$ ($0<\alpha<1$), when Ea is equal to 0, Er is equal to $\alpha*Eh$, and when Ea is equal to 1, Er is equal to Eh. Therefore, even if blackout areas or whiteout areas form a large proportion of the entire screen, it is possible to weaken correction when there are few bright portions or dark portions occurring concentratedly.

In the step S605, since the image has little blackout or whiteout on the entire screen thereof, the exposure correction value calculation section 107 sets the entire-screen frequency distribution-based exposure control value Eh to the exposure correction value Er without calculation of Ea.

Then, the exposure value calculation section 108 adds the exposure correction value Er calculated in the step S604 or S605 to an exposure value Et of the picked-up image signal (step S606). Then, the exposure control section 109 sets the exposure value Et calculated by the exposure value calculation section 108 to the image pickup section 101, and the image pickup section 101 picks up an image (step S607).

The exposure control section 109 determines whether or not the exposure value has been finally determined by a predetermined operation (step S608). If the exposure control section 109 determines that the exposure value has been finally determined by the predetermined operation (YES to the step S608), the present process is terminated. In the present embodiment, when the exposure correction value Er remains zero through a plurality of loops, the exposure control section 109 judges that the exposure correction value has been converged and determines that the exposure value has been finally determined. If the exposure control section 109 determines that the exposure value has not been finally determined (NO to the step S608), the process returns to the step S601, and the steps S601 to S607 are repeatedly carried out. Specifically, in still image shooting, the exposure value can be finally determined when the focus is locked. Further, in still image shooting, the process may be terminated when the loop processing is carried out a designated number of times.

Figure 6:
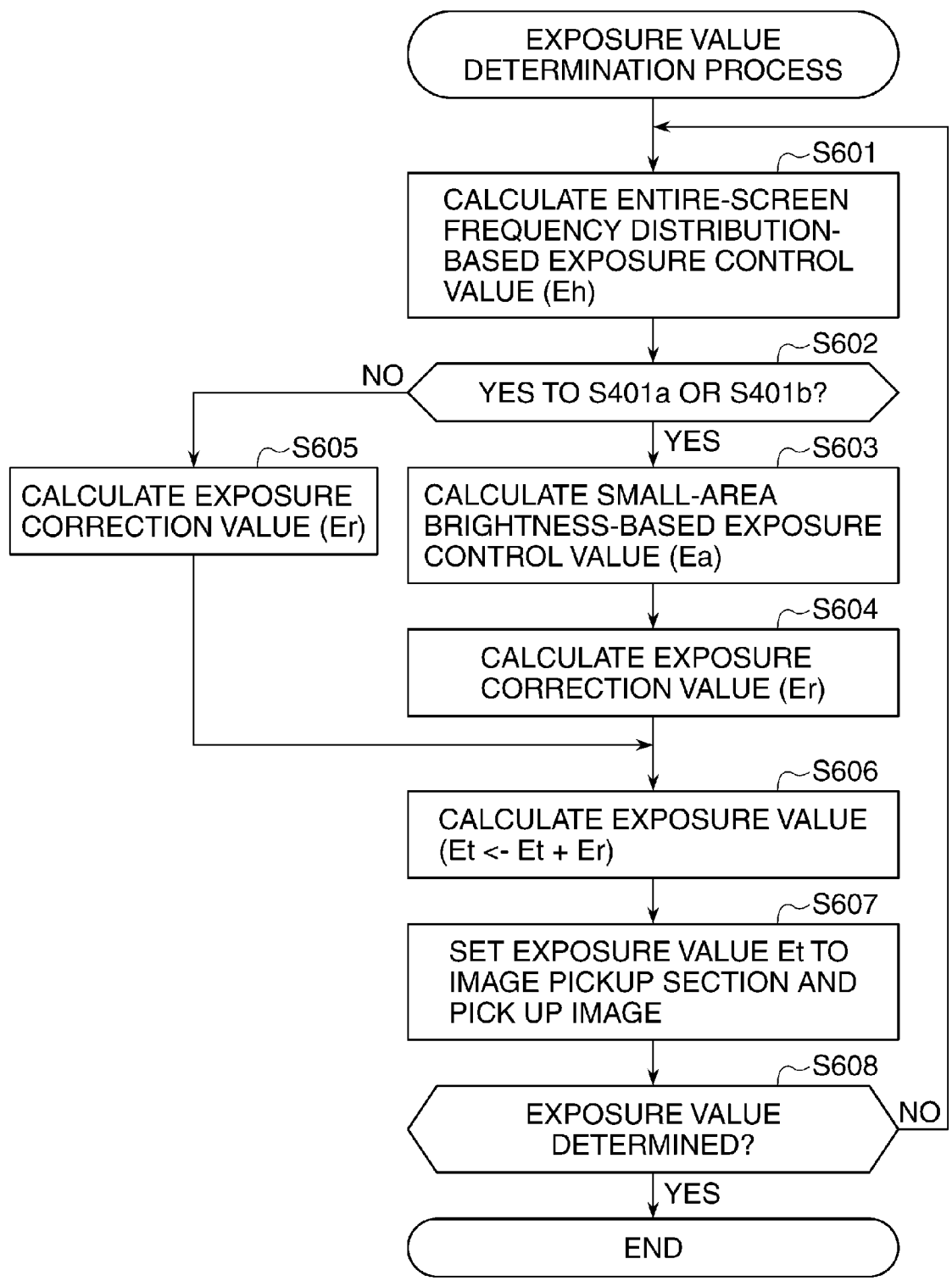
FIG. 6 is a flowchart of an exposure control value determination process executed by the image pickup apparatus according to the first embodiment.

On the other hand, in moving image shooting, the processing in the steps S601 to S607 in FIG. 6 is always performed, and therefore the process is terminated when a shooting button is pressed.

As described above, according to the present embodiment, exposure control is performed based on the exposure control value obtained from the entire-screen frequency distribution and the small-area brightness-based exposure control value obtained from brightness values in the respective small areas obtained by dividing the screen. Thus, it is possible not only to detect whiteout or blackout, but also to effectively achieve exposure control according to distribution of whiteout areas or blackout areas in the picked-up image.

The exposure correction value calculation section 107 may use the entire-screen frequency distribution-based exposure control value Eh to correct the small-area brightness-based exposure control value Ea calculated by the small-area brightness-based exposure control value calculation section 106. In this case, the entire-screen frequency distribution-based exposure control value Eh is calculated by the control value calculation section 104, as described hereinbefore, and for example, the small-area brightness-based exposure control value calculation section 106 calculates the entire-screen frequency distribution-based exposure control value Eh as a multiple value, not as a binary value of 0 or 1.

More specifically, in this variation, the control value calculation section 104 obtains a value of 1 as the entire-screen frequency distribution-based exposure control value Eh in the step S402a. Further, the control value calculation section 104 obtains a value of 0 as Eh in the step S404a, and obtains a value of −1 as Eh in the step S405a so as to eliminate black floating.

On the other hand, in the step S402b, the control value calculation section 104 obtains −1 as the entire-screen frequency distribution-based exposure control value Eh. Further, the control value calculation section 104 obtains 0 as Eh in the step S404b, and obtains 1 as Eh in the step S405b so as to eliminate white sinking.

When Eh=1, the exposure correction value calculation section 107 sets the exposure correction value Er to the small-area brightness-based exposure control value Ea. Further, when Eh=0, the exposure correction value calculation section 107 sets Er to 0, and when Eh=−1, the exposure correction value calculation section 107 sets Er to −Ea.

In the following, a description will be given of an image pickup apparatus according to a second embodiment of the present invention, with reference to FIGS. 7 to 9. The image pickup apparatus of the second embodiment is configured to be capable of controlling the exposure of a wide dynamic range picked-up image signal formed by combining picked-up image signals which are picked up using respective different exposure values, i.e. a first exposure value and a second exposure value relatively higher than the first exposure value. The image pickup apparatus of the second embodiment is capable of executing exposure control on the wide dynamic range picked-up image signal so as to reduce both whiteout and blackout.

Now, the image pickup apparatus of the second embodiment will be described with reference to FIG. 7. Note that the same components as those of the first embodiment are denoted by the same reference numerals, and detailed description thereof is omitted.

Figure 7:
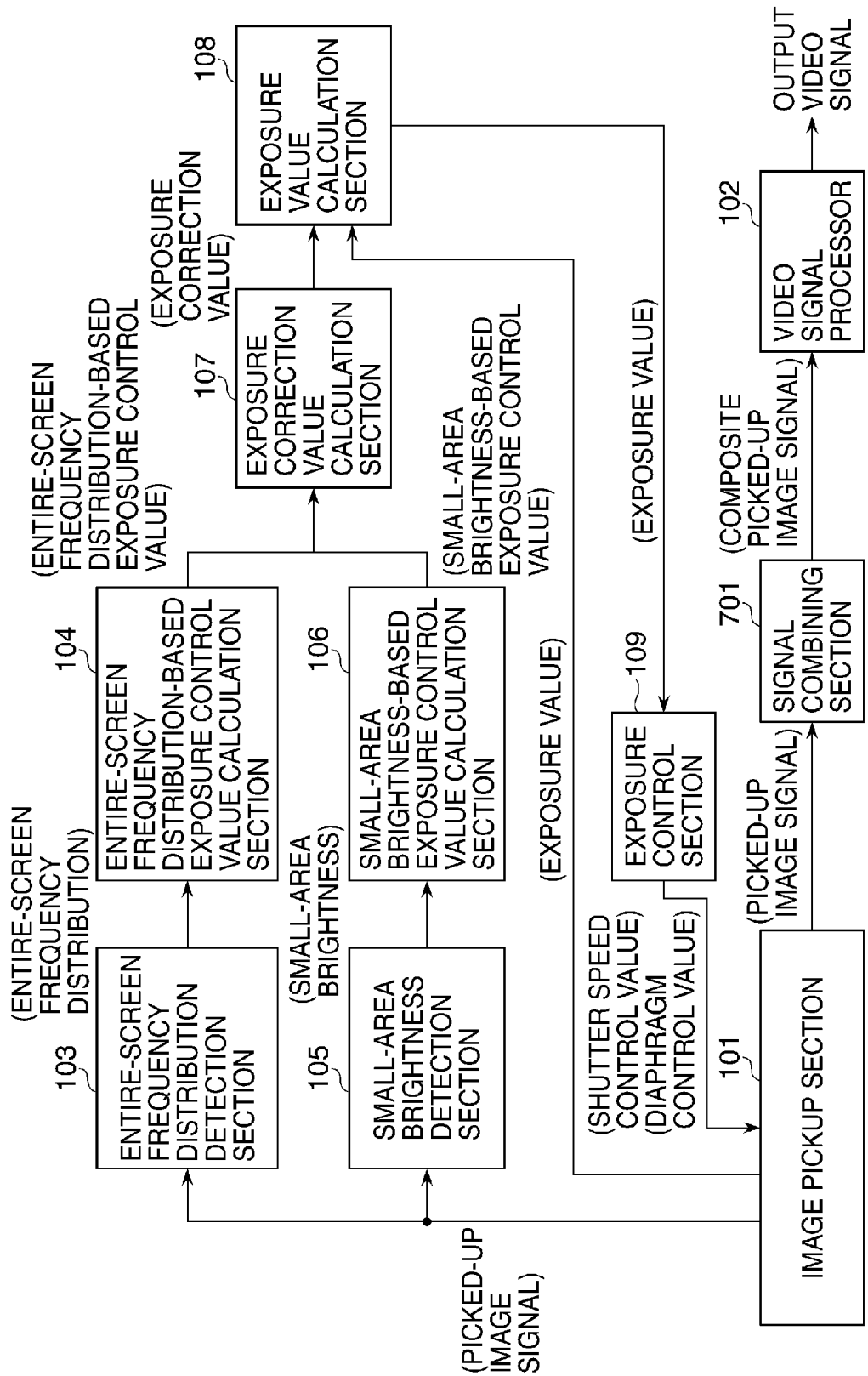
FIG. 7 is a schematic block diagram of an image pickup apparatus according to a second embodiment of the present invention.

FIG. 7 is a schematic block diagram of the image pickup apparatus according to the second embodiment. Reference numeral 701 denotes a signal combining section that combines a picked-up image signal picked up using the first exposure value and a picked-up image signal picked up using the second exposure value and outputs the combined image signal. The signal combining section 701 is capable of performing synthesis processing for combining picked-up image signals picked up using two different exposure values, respectively. In this case, for example, the signal combining section 701 sets a predetermined brightness value first. Then, the signal combining section 701 acquires a pixel signal of the picked-up image signal picked up using the first exposure value, which is a low exposure image signal, as an image signal after the combining, which is associated with an area of higher brightness values in the picked-up image signal using the first exposure value than the predetermined brightness value. Further, the signal combining section 701 acquires a pixel signal of the picked-up image signal picked up using the second exposure value, which is a high exposure image signal, as an image signal after the combining, which is associated with an area of lower brightness values in the picked-up image signal using the first exposure value than the predetermined brightness value. Then, the signal combining section 701 performs gain correction, based on an exposure ratio between the picked-up image signal associated with the first exposure value and the picked-up image signal associated with the second exposure value, by adjusting the signal intensity of one of the two picked-up image signals to that of the other such that the two picked-up image signals have the same level of signal intensity. This gain correction may be executed in combination with ordinary gamma correction.

Specifically, assuming that the exposure ratio between the picked-up image signal associated with the first exposure value and the picked-up image signal associated with the second exposure value is 1:10, the light amount of the picked-up image signal associated with the first exposure value is one tenth of that of the picked-up image signal associated with the second exposure value, and therefore by multiplying the signal intensity of the picked-up image signal associated with the first exposure value by a gain of 10, the signal combining section 701 can make the signal intensity of the picked-up image signal associated with the first exposure value equal in level to that of the picked-up image signal associated with the second exposure value. Further, it is also possible to synthesize an image according to a signal intensity obtained by dividing the signal intensity of the picked-up image signal associated with the second exposure value by 10. Note that the image pickup apparatus according to the second embodiment has the same configuration as that of the image pickup apparatus shown in FIG. 1 except the above-described points.

Figure 8:
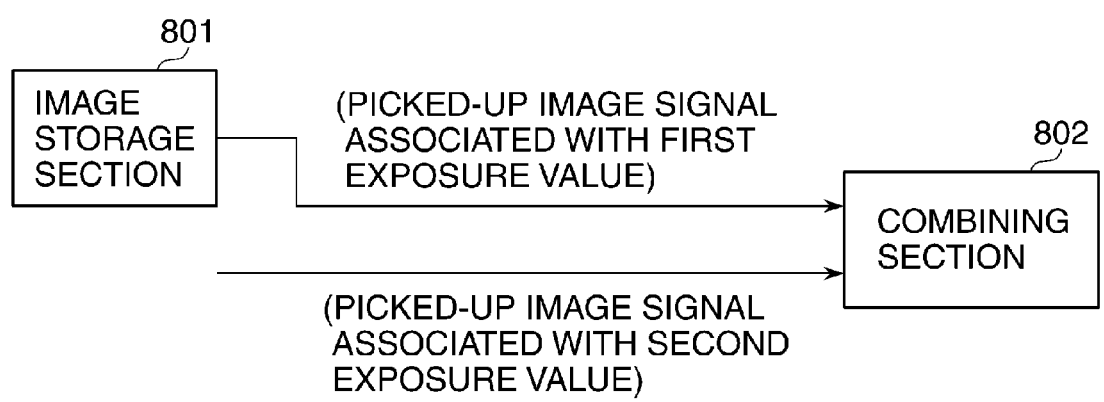
FIG. 8 is a schematic block diagram of a signal combining section of the image pickup apparatus according to the second embodiment.

The signal combining section 701 of the image pickup apparatus is provided with an image storage section 801 and a combining section 802, as shown in FIG. 8, so as to enable exposure control to be executed on a wide dynamic range picked-up image signal.

In the present image pickup apparatus, the image pickup section 101 alternately and continuously picks up images with two different exposure values, as the picked-up image signal associated with the first exposure value and the picked-up image signal associated with the second exposure value. The picked-up image signals thus picked up are temporarily stored in the image storage section 801 of the signal combining section 701.

Thereafter, when the image pickup section 101 picks up a last picked-up image signal to be synthesized, the combining section 802 combines at least two picked-up image signals using the picked-up image signals stored in the image storage section 801 and the last picked-up image signal. For example, in the case of combining the picked-up image signals picked up using the respective first and second exposure values, the combining section 802 performs matching of the level of signal intensity between the picked-up image signals and then outputs a combined image signal.

Next, a description will be given of exposure control of picked-up image signals in wide dynamic range picked-up image signal generation, which is executed by the image pickup apparatus of the second embodiment.

In the exposure control of picked-up image signals in wide dynamic range picked-up image signal generation, control is performed using two different exposure values, i.e. a first exposure value Et1 and a second exposure value Et2 higher in exposure amount than the first exposure value Et1. For this reason, differently from the first embodiment, the image pickup section 101 performs an operation for alternately acquiring the picked-up image signal associated with the first exposure value and the picked-up image signal associated with the second exposure value.

Figure 9A:
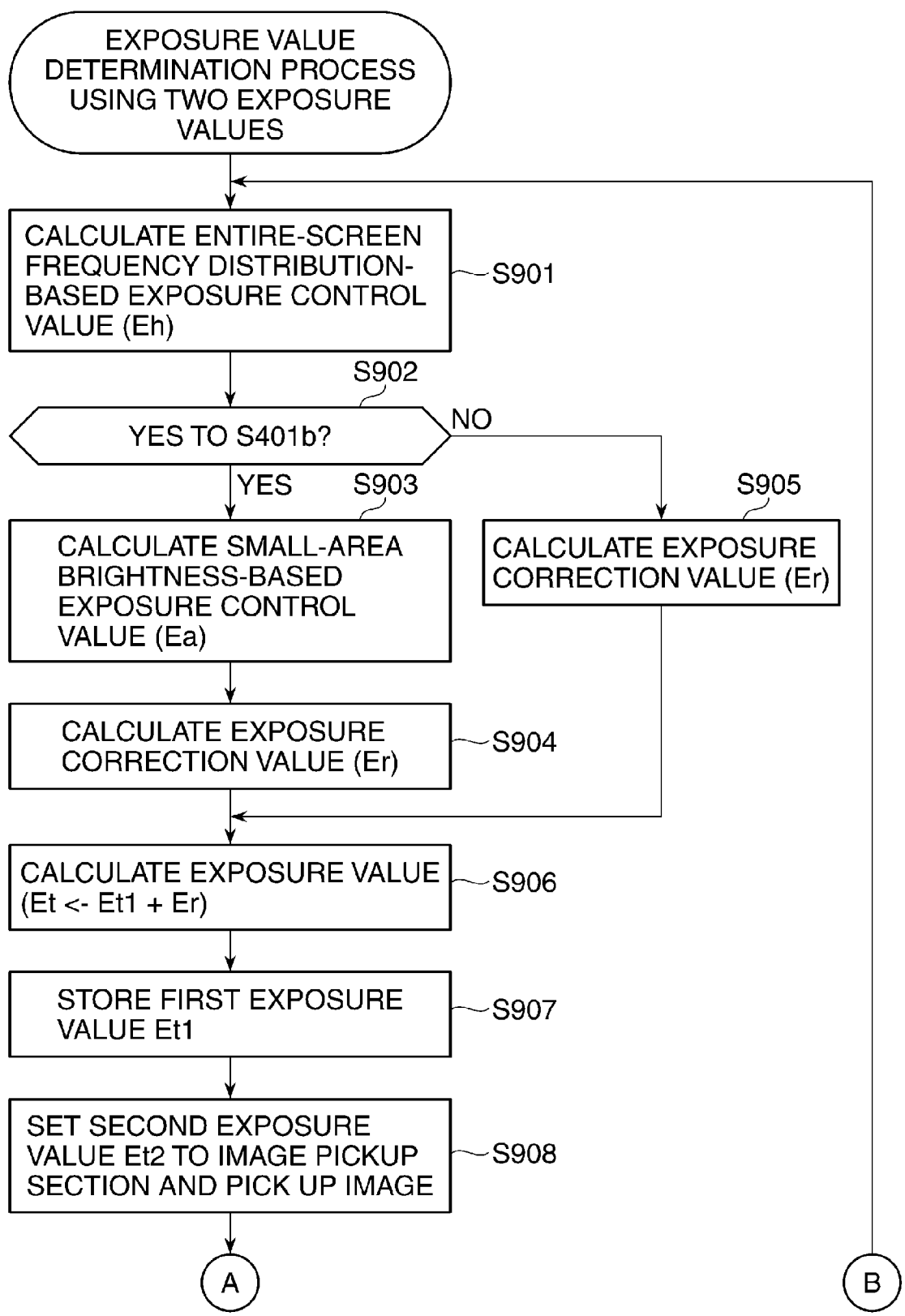
FIGS. 9A and 9B are a flowchart of an exposure control value determination process executed by the image pickup apparatus according to the second embodiment.
Figure 9B:
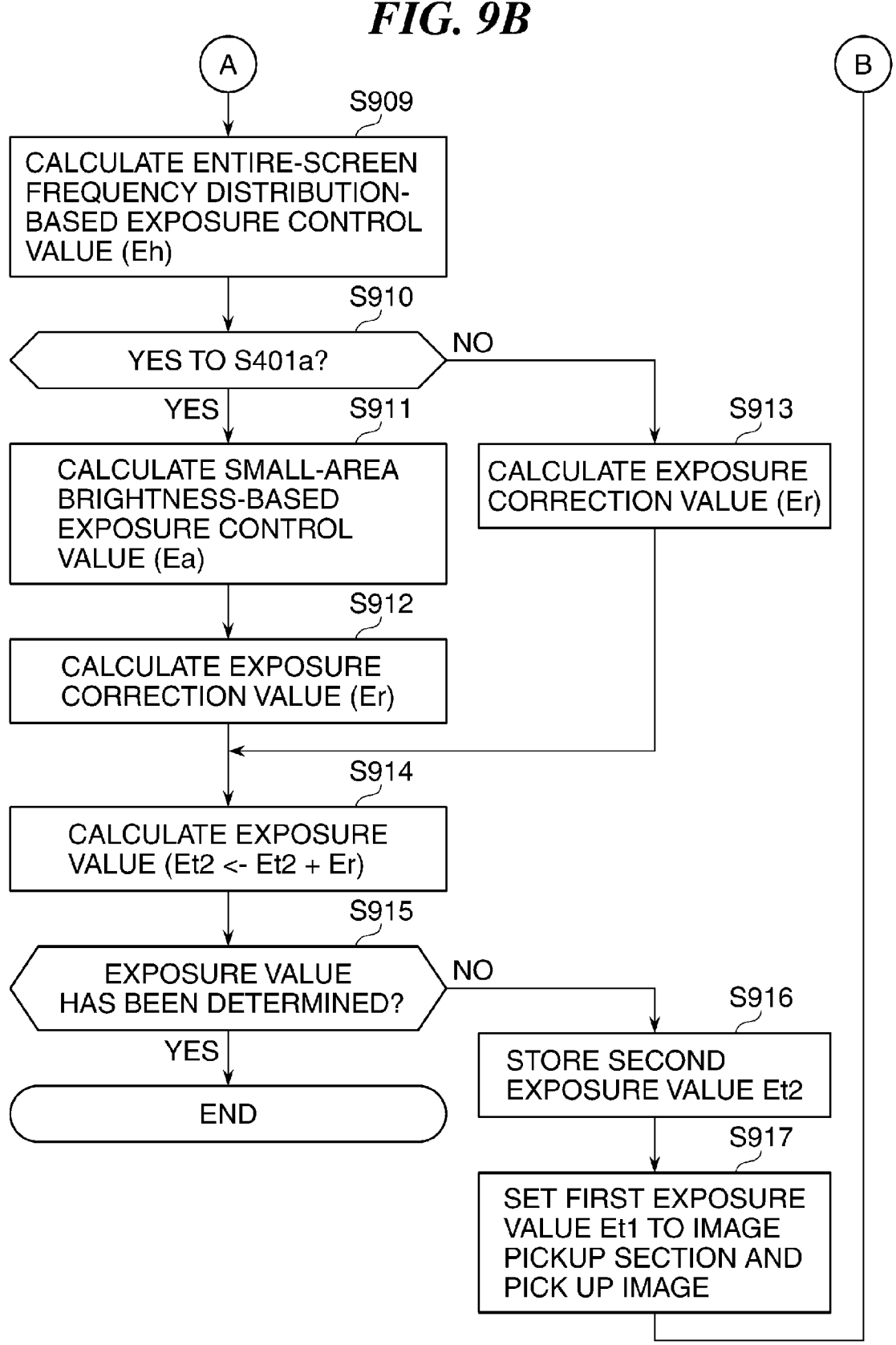

Next, a description will be given of an exposure value determination process executed by the image pickup apparatus of the second embodiment in a case where two exposure values are used, with reference to FIGS. 9A and 9B. When the user performs an operation for determining an exposure for image pickup, the image pickup apparatus starts the exposure control value determination process which is executed when the image pickup apparatus uses two exposure values. In the exposure control value determination process executed in using two exposure values, exposure control associated with the first exposure value is executed first. For this reason, the image pickup section 101 carries out pre-processing for acquisition of the picked-up image signal associated with the first exposure value.

The control value calculation section 104 calculates the entire-screen frequency distribution-based exposure control value Eh from the picked-up image signal associated with the first exposure value Et1, which is output from the image pickup section 101 (step S901). The first exposure value Et1 is for obtaining an image free from whiteout, and therefore, in the step S901, the calculation process for calculating the entire-screen frequency distribution-based exposure control value for reducing whiteout, which was described with reference to FIG. 4B in the first embodiment, is executed. Then, in a step S902, depending on the result of the calculation process in the step S901, i.e. whether the answer to the question of the step S401b in FIG. 4B is affirmative (YES) or negative (NO), the following step is switched. More specifically, if the answer to the question of the step S401b in FIG. 4B is affirmative (YES), the process proceeds to a step S903. On the other hand, if the answer to the question of the step S401b in FIG. 4B is negative (NO), the process proceeds to a step S905 without calculation of the small-area brightness-based exposure control value Ea. In the step S903, the small-area brightness-based exposure control value calculation section 106 calculates the small-area brightness-based exposure control value Ea.

Then, as in the first embodiment, the exposure correction value calculation section 107 corrects the entire-screen frequency distribution-based exposure control value Eh based on the small-area brightness-based exposure control value Ea calculated by the small-area brightness-based exposure control value calculation section 106, to thereby calculate an exposure correction value Er (step S904).

On the other hand, in the step S905, since it is determined that the image has little whiteout on the entire screen thereof, the entire-screen frequency distribution-based exposure control value Eh is corrected to the exposure correction value Er without calculation of the small-area brightness-based exposure control value Ea. Then, the exposure value calculation section 108 adds the exposure correction value Er calculated in the step S904 or S905 to the exposure value Et of the picked-up image signal to thereby calculate the first exposure value Et1 (step S906). The thus obtained first exposure value Et1 is stored in the image pickup section 101 (step S907).

Then, the exposure control section 109 reads out the second exposure value Et2 from the image pickup section 101 to set the second exposure value. Then, the exposure control section 109 controls the image pickup section 101 by the second exposure value Et2 to obtain a picked-up image signal picked up using the second exposure value Et2 (step S908).

Then, the control value calculation section 104 calculates the entire-screen frequency distribution-based exposure control value Eh from the picked-up image signal picked up using the second exposure value Et2 and output from the image pickup section 101 (step S909). The second exposure value Et2 is for obtaining an image free from blackout, and therefore, in the step S909, the calculation process for calculating the entire-screen frequency distribution-based exposure control value for reducing blackout, which was described with reference to FIG. 4A in the first embodiment, is executed. Then, in a step S910, depending on the result of the calculation process in the step S909, i.e. whether the answer to the question of the step S401a in FIG. 4A is affirmative (YES) or negative (NO), the following step is switched. If the answer to the question of the step S401a is affirmative (YES), the process proceeds to a step S911. On the other hand, if the answer to the question of the step S401a is negative (NO), the process proceeds to a step S913, without calculation of the small-area brightness-based exposure control value Ea. In the step S911, the small-area brightness-based exposure control value calculation section 106 calculates the small-area brightness-based exposure control value Ea.

Then, similarly to the first embodiment, the exposure correction value calculation section 107 corrects the entire-screen frequency distribution-based exposure control value Eh based on the small-area brightness-based exposure control value Ea calculated by the small-area brightness-based exposure control value calculation section 106, to thereby calculate the exposure correction value Er (step S912).

On the other hand, in the step S913, since it is determined that the image has little blackout on the entire screen thereof, the entire-screen frequency distribution-based exposure control value Eh is corrected to the exposure correction value Er without calculation of the small-area brightness-based exposure control value Ea. Then, the exposure value calculation section 108 adds the exposure correction value Er calculated in the step S912 or S913 to the exposure value Et of the picked-up image signal to thereby calculate the second exposure value Et2 (step S914).

Then, the exposure control section 109 determines from a predetermined operation whether or not the exposure value has been finally determined (step S915). If the exposure control section 109 determines from the predetermined operation that the exposure value has been finally determined (YES to the step S915), the present process is terminated. In the present embodiment, when the exposure correction value Er remains zero through a plurality of loops, the exposure control section 109 judges that the exposure correction value has been converged and determines that the exposure value has been finally determined. If the exposure control section 109 determines that the exposure value has not been finally determined (NO to the step S915), the process proceeds to a step S916, wherein the second exposure value Et2 is stored.

Then, the exposure control section 109 reads out the first exposure value Et1 from the image pickup section 101 and controls the image pickup section 101 by the first exposure value Et1. The image pickup section 101 sets the first exposure value Et1 for image pickup and obtains a picked-up image signal (step S917).

Thereafter, the process returns to the step S901, and the exposure control section 109 repeatedly carries out the steps S901 to S914 until it is determined in the step S915 that the exposure value has been finally determined. Although in the above-described exposure control value determination process executed using the two exposure values, exposure control associated with the first exposure value is executed first, exposure control associated with the second exposure value may be executed first.

In the present image pickup apparatus, the signal combining section 701 generates a combined image signal from picked-up image signals picked up using the respective first and second exposure values determined by the above-described exposure control value determination process in FIG. 9 which is executed using the two exposure values.

Although in the exposure control value determination process in FIG. 9 executed using the two exposure values, appropriate first and second exposure values are determined based on picked-up image signals picked up using respective different exposure values, the appropriate first and second exposure values may be determined based on a combined image as an output from the combining section 802. In this case, exposure control operation is performed on the combined image according to the FIG. 6 process, whereby the appropriate first and second exposure values can be determined.

In short, in the image pickup apparatus according to the present embodiment, the entire-screen frequency (first brightness) distribution of a picked-up image signal is detected, and exposure control is performed so as to prevent whiteout or blackout. In this exposure control, the image pickup apparatus detects whether whiteout areas or blackout areas are scattered or concentrated on the picked-up image, and adjusts the control correction value according to the degree of dispersion or concentration so as to obtain a noise-reduced excellent image. Further, the image pickup apparatus detects a contiguity between blocks as areas for detecting whiteout or blackout, which are higher or lower in brightness value than respective predetermined values, and adjusts the control correction amount depending on the contiguity, i.e. the number of contiguous blocks which have been determined to have higher or lower brightness values than the respective predetermined values (contiguous block count) to thereby obtain an appropriate image.

To the above-mentioned ends, the image pickup apparatus is provided with the entire-screen frequency distribution detection section 103 and the control value calculation section 104 for detecting the entire-screen frequency distribution of a picked-up image signal and performing exposure control so as to prevent whiteout and blackout.

The image pickup apparatus is provided with the small-area brightness detection section 105 (second brightness detection unit) and the small-area brightness-based exposure control value calculation section 106 (second exposure control value calculation unit) so as to adjust the control correction amount according to the degree of dispersion or concentration of whiteout areas or blackout areas on a picked-up image.

In the present image pickup apparatus, an output value from the control value calculation section 104 (first exposure control value calculation unit) and an output value from the small-area brightness-based exposure control value calculation section 106 are input to the exposure correction value calculation section 107. The exposure correction value calculation section 107 calculates an appropriate exposure correction value based on the entire-screen frequency distribution-based exposure control value (first exposure control value) and the small-area brightness-based exposure control value (second exposure control value) and outputs the obtained exposure correction value. The image pickup apparatus controls functions, such as the shutter speed (object light exposure time) and the diaphragm function, using the exposure correction value output from the exposure correction value calculation section 107, to thereby perform exposure control for appropriate image pickup.

Next, a detailed description will be given of how the small-area brightness detection section 105 of the preset image pickup apparatus sets the areas for detecting whether whiteout areas or blackout areas are scattered or concentrated on a picked-up image.

By checking the image pickup apparatus of the present embodiment, it is turned out that whiteout or blackout becomes conspicuous when whiteout areas or blackout areas come to be concentrated in clusters in an area corresponding to 1% of the entire area of an image. Therefore, in the image pickup apparatus of the present embodiment, it is theoretically desirable that the size of one block as a detection area (small-area block: IPXX) for detecting whiteout or blackout is set to 1% of the entire area of an image.

In the present image pickup apparatus, however, as the size of one block as a detection area is set to be smaller, processing time becomes longer and the small-area brightness detection section 105 becomes more complicated in configuration. This causes an increase in the size of the small-area brightness detection section 105. In view of these inconveniences, according to the present embodiment, it is theoretically desirable that the size of one block as a detection area for detecting whiteout or blackout is set to 5% of the entire area of an image so as to appropriately design the image pickup apparatus.

The size of one block set as a detection area for detecting whiteout or blackout is dependent on the size of an image picked up by the image pickup apparatus. Therefore, by observing the screen of the image pickup apparatus, the size of one block is considered with reference to a size which will make whiteout or blackout conspicuous. Further, the size of one block is determined as deemed appropriate by taking into account conditions for properly designing the image pickup apparatus.

Further, in the present image pickup apparatus, it is determined whether or not whiteout areas are concentrated, based on how many pixels having a pixel value not smaller than a predetermined value set as a threshold value are contained within one block.

In this case, when it is determined that pixels in the one block are all (approximately 100%) associated with whiteout, the control may be configured such that the correction for reducing the control amount is not performed. On the other hand, when it is determined that the one block contains no (or close to 0%) pixel associated with whiteout, the control may be configured such that the correction may be performed such that the control amount is minimized.

Figure 10:
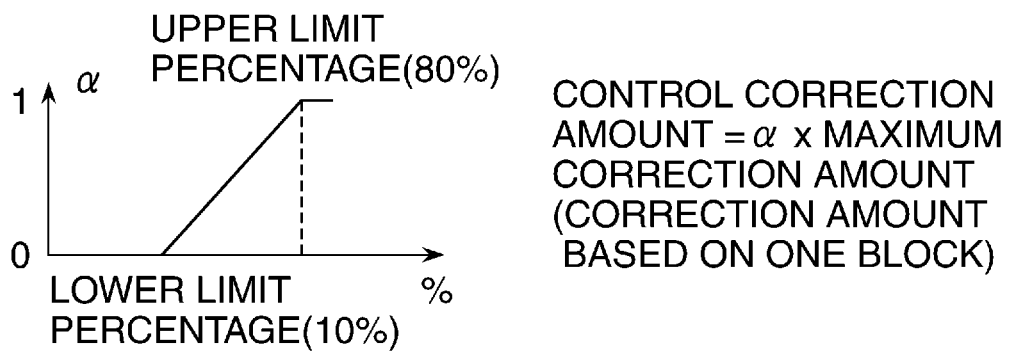
FIG. 10 is a diagram useful in explaining a method of determining a control correction amount by the image pickup apparatus according to the second embodiment.

Specifically, in the present image pickup apparatus, a lower limit percentage (10% in the present example) and an upper limit percentage (80% in the present example) are set as shown in FIG. 10. Further, a coefficient $\alpha$ that assumes a value within a range between 0 and 1 is set as shown in FIG. 10. Then, the control correction amount is obtained by multiplying a maximum correction amount by the coefficient $\alpha$ corresponding to a percentage of pixels determined as associated with whiteout (or blackout) of all the pixels in the one block.

Next, a description will be given of a case where the image pickup apparatus detects a contiguity between blocks as areas for detecting whiteout or blackout which have been determined to have higher or lower brightness values than the respective predetermined values (contiguous block count) and detects the degree of scattering of whiteout areas or blackout areas in a larger area. More specifically, the image pickup apparatus detects a contiguous block count indicative of the number of small-area blocks existing in a group of contiguous small-area blocks where whiteout or blackout has occurred simultaneously. The contiguous block count is used to discriminate whether whiteout areas or blackout areas are scattered or concentrated in a group.

Figure 11:
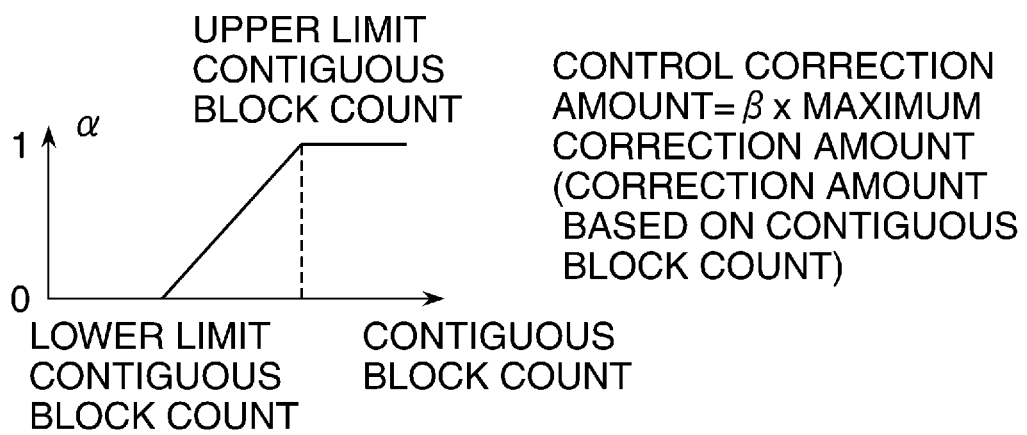
FIG. 11 is a diagram useful in explaining a method of determining a control correction amount based on a contiguous block count by the image pickup apparatus according to the second embodiment.
Figure 12A:
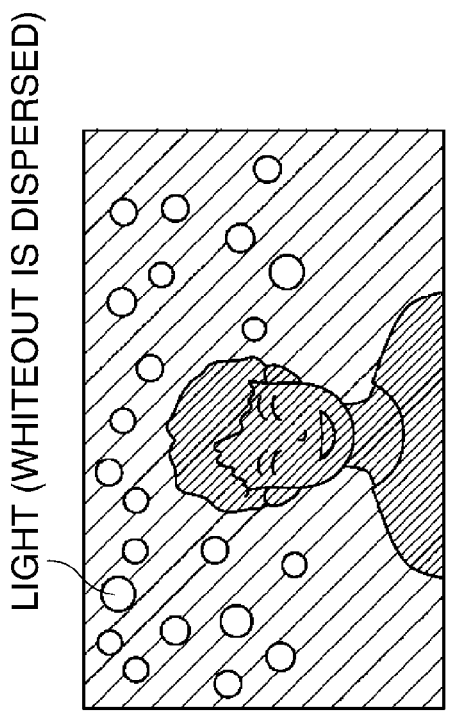
FIGS. 12A to 12D are views and diagrams useful in explaining a problem in the prior art.
Figure 12B:
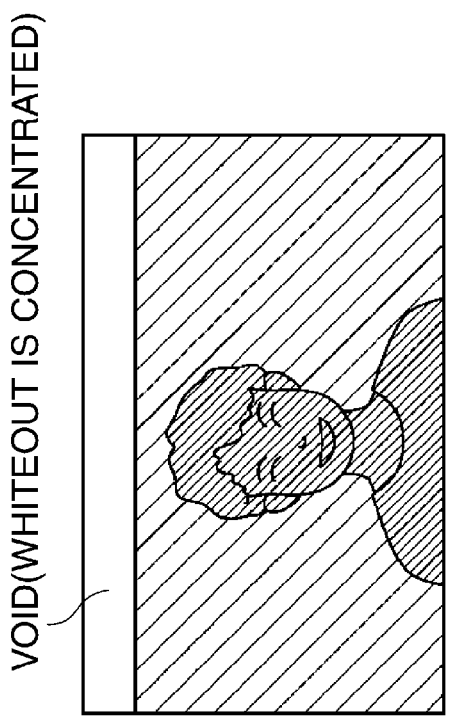
Figure 12C:
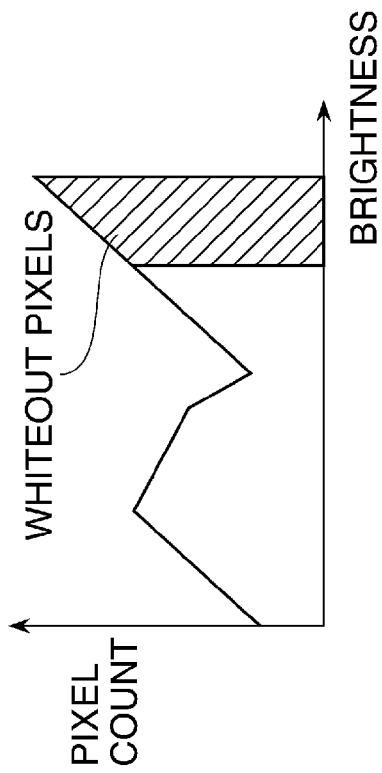
Figure 12D:
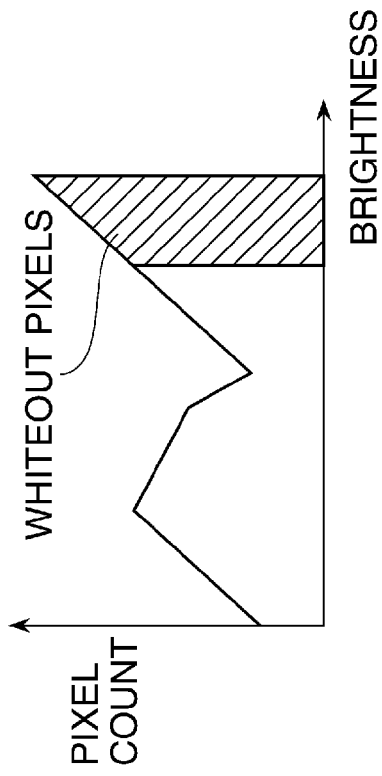

Specifically, in the present image pickup apparatus, a lower limit contiguous block count and an upper limit contiguous block count are set as shown in FIG. 11. Further, a coefficient β that assumes a value within a range between 0 and 1 is set as shown in FIG. 11. Then, the control correction amount is obtained by multiplying a maximum correction amount by the coefficient β corresponding to the contiguous block count. The lower limit contiguous block count and the upper limit contiguous block count are required to be set in accordance with a block size. Therefore, in the case of setting the lower limit contiguous block count and the upper limit contiguous block count, first, the size of one block set as a detection area for the above-described detecting whiteout or blackout is determined. Next, a contiguous block count (upper limit percentage) of contiguous blocks each having the determined size, which starts to make whiteout conspicuous, and a contiguous block count (lower limit percentage) of contiguous blocks each having the determined size, which starts to make whiteout inconspicuous, are determined e.g. by subjective evaluation.

In the present image pickup apparatus, the control correction amount obtained based on the degree of dispersion or concentration of whiteout areas or blackout areas on a picked-up image and the control correction amount obtained based on a contiguous block count are used, as described above. This makes it possible to further reduce noise adversely affecting an image screen than in a case where the entire-screen frequency distribution of a picked-up image signal is detected and then exposure control is performed so as to prevent whiteout or blackout. Further, in the present image pickup apparatus, the degree of subjective conspicuousness of whiteout or blackout differs between a case where a certain amount of whiteout or blackout is not all concentrated in an area, but whiteout or blackout areas are scattered around, some forming clusters, and a case where whiteout or blackout areas are scattered all over. For example, when whiteout areas are scattered around, some forming clusters, whiteout is conspicuous, and therefore the present image pickup apparatus performs control such that an exposure time for an image to be picked up is reduced. On the other hand, for example, when whiteout areas are scattered all over, the degree of subjective conspicuousness of whiteout is low, and therefore the present image pickup apparatus performs control such that an exposure time for an image to be picked up is increased, so as to generate a noise-reduced image.

The present image pickup apparatus generates a combined image signal having a wide dynamic range. The amount of light that the image pickup apparatus can receive for normal shooting is limited, and therefore when frequency distribution-based correction is performed so as to prevent blackout, bright portions are liable to whiteout. On the other hand, when frequency distribution-based correction is performed so as to prevent whiteout, dark portions are liable to blackout. To solve this problem, the present image pickup apparatus picks up a wide dynamic range combined image to thereby generate a low exposure image free from whiteout and a high exposure image free from blackout. Thus, it is possible to generate an image free from whiteout and blackout.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2011-115787 filed May 24, 2011, and Japanese Patent Application No. 2012-111263 filed May 15, 2012, which are hereby incorporated by reference herein in their entirety.

What is claimed is:

1. An image pickup apparatus that includes an image pickup section for picking up object light and outputting an image signal, comprising:
   a first brightness detection unit configured to detect an entire-screen brightness frequency distribution based on the image signal;
   a first exposure control value calculation unit configured to calculate a first exposure control value from the entire-screen brightness frequency distribution;
   a second brightness detection unit configured to divide the image signal into a plurality of small areas and detect a brightness of each of the small areas;
   a second exposure control value calculation unit configured to calculate a second exposure control value from the brightness, which is detected by said second brightness detection unit, of each of the small areas;
   an exposure correction value calculation unit configured to calculate an exposure correction value based on the first exposure control value and the second exposure control value;
   an exposure value calculation unit configured to calculate an exposure value using the exposure correction value and an exposure value used in outputting the image signal; and
   an exposure control unit configured to perform exposure control of the image pickup section based on the exposure value calculated by said exposure value calculation unit.

2. The image pickup apparatus according to claim 1, wherein said exposure value calculation unit calculates at least two different exposure values including a first exposure value for a low exposure image signal, which is associated with a relatively small exposure amount, and a second exposure value for a high exposure image signal, which is associated with a relatively large exposure amount.

3. The image pickup apparatus according to claim 2, wherein said exposure correction value calculation unit corrects the first exposure control value calculated by said first exposure control value calculation unit, based on the second exposure control value calculated by said second exposure control value calculation unit, to thereby calculate the exposure correction value.

4. The image pickup apparatus according to claim 3, wherein in a case where the first exposure value is calculated by said exposure value calculation unit, when a small-area brightness detected by said second brightness detection unit is not lower than a predetermined threshold value, said second exposure control value calculation unit calculates the second exposure control value such that the exposure amount is reduced.

5. The image pickup apparatus according to claim 3, wherein in a case where the first exposure value is calculated by said exposure value calculation unit, when a small-area brightness detected by said second brightness detection unit is not higher than a predetermined threshold value, said second exposure control value calculation unit calculates the second exposure control value such that the exposure amount is increased.

6. The image pickup apparatus according to claim 3, wherein in a case where the second exposure value is calculated by said exposure value calculation unit, when a small-area brightness detected by said second brightness detection unit is not higher than a predetermined threshold value, said second exposure control value calculation unit calculates the second exposure control value such that the exposure amount is increased.

7. The image pickup apparatus according to claim 3, wherein in a case where the second exposure value is calculated by said exposure value calculation unit, when a small-area brightness detected by said second brightness detection unit is not lower than a predetermined threshold value, said second exposure control value calculation unit calculates the second exposure control value such that the exposure amount is reduced.

8. The image pickup apparatus according to claim 3, further comprising a predetermined-area range detection unit configured to detect a small-area range where a small-area brightness detected by said second brightness detection unit is not lower than a first predetermined threshold value or not higher than a second predetermined threshold value, and
wherein said second exposure control value calculation unit calculates the second exposure control value according to the small-area range detected by said predetermined-area range detection unit.

9. The image pickup apparatus according to claim 8, wherein in a case where the first exposure value is calculated by said exposure value calculation unit, when a contiguous range of small-area blocks detected by said predetermined-area range detection unit is not smaller than a predetermined range threshold value, the second exposure control value is calculated such that the exposure amount is reduced.

10. The image pickup apparatus according to claim 8, wherein in a case where the first exposure value is calculated by said exposure value calculation unit, when a contiguous range of small-area blocks detected by said predetermined-area range detection unit is not larger than a predetermined range threshold value, the second exposure control value is calculated such that the exposure amount is increased.

11. The image pickup apparatus according to claim 8, wherein in a case where the second exposure value is calculated by said exposure value calculation unit, when a contiguous range of small-area blocks detected by said predetermined-area range detection unit is not larger than a predetermined range threshold value, the second exposure control value is calculated such that the exposure amount is increased.

12. The image pickup apparatus according to claim 8, wherein in a case where the second exposure value is calculated by said exposure value calculation unit, when a contiguous range of small-area blocks detected by said predetermined-area range detection unit is not smaller than a predetermined range threshold value, the second exposure control value is calculated such that the exposure amount is reduced.

13. The image pickup apparatus according to claim 1, wherein said second brightness detection unit detects a signal intensity integrated value of pixels in a small area as a small-area brightness.

14. A method of controlling an image pickup apparatus that includes an image pickup section for picking up object light and outputting an image signal, comprising:
detecting an entire-screen brightness frequency distribution based on the image signal;
calculating a first exposure control value from the entire-screen brightness frequency distribution;
dividing the image signal into a plurality of small areas and detecting a brightness of each of the small areas;
calculating a second exposure control value from the detected brightness of each of the small areas;
calculating an exposure correction value based on the first exposure control value and the second exposure control value;
calculating an exposure value using the exposure correction value and an exposure value used in outputting the image signal; and
performing exposure control of the image pickup section based on the calculated exposure value.

15. A non-transitory computer-readable storage medium storing a computer-executable program for executing a method of controlling an image pickup apparatus that includes an image pickup section for picking up object light and outputting an image signal,
wherein the method comprises:
detecting an entire-screen brightness frequency distribution based on the image signal;
calculating a first exposure control value from the entire-screen brightness frequency distribution;
dividing the image signal into a plurality of small areas and detecting a brightness of each of the small areas;
calculating a second exposure control value from the detected brightness of each of the small areas;
calculating an exposure correction value based on the first exposure control value and the second exposure control value;
calculating an exposure value using the exposure correction value and an exposure value used in outputting the image signal; and
performing exposure control of the image pickup section based on the calculated exposure value.

* * * * *